April 17, 1934.  C. H. PURDY  1,955,655
BAKERY EQUIPMENT AND METHOD OF USING THE SAME
Filed Sept. 19, 1933  2 Sheets-Sheet 1
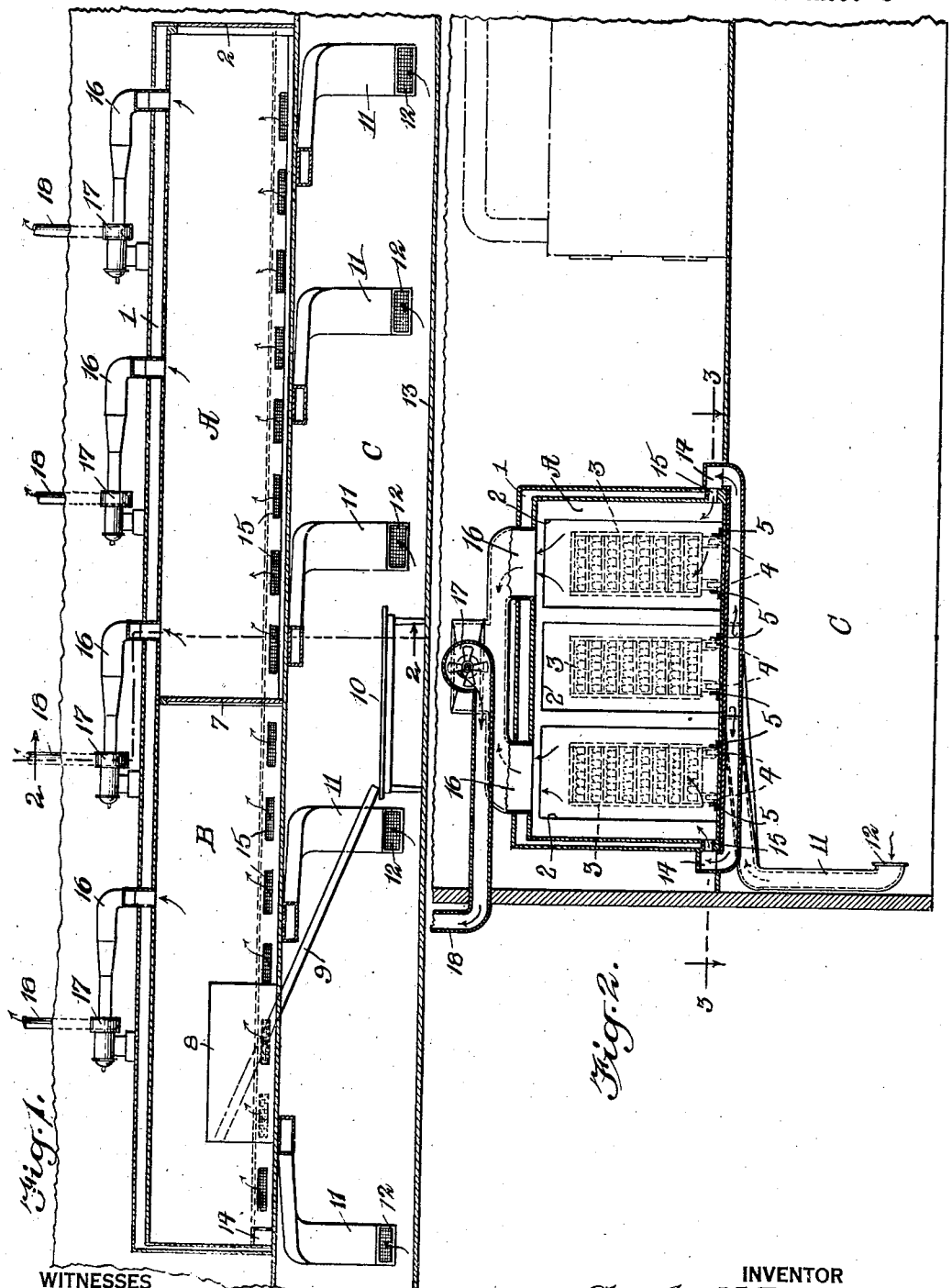
WITNESSES
INVENTOR
Charles H. Purdy
BY
ATTORNEYS April 17, 1934.       C. H. PURDY       1,955,655
BAKERY EQUIPMENT AND METHOD OF USING THE SAME
Filed Sept. 19, 1933    2 Sheets-Sheet 2
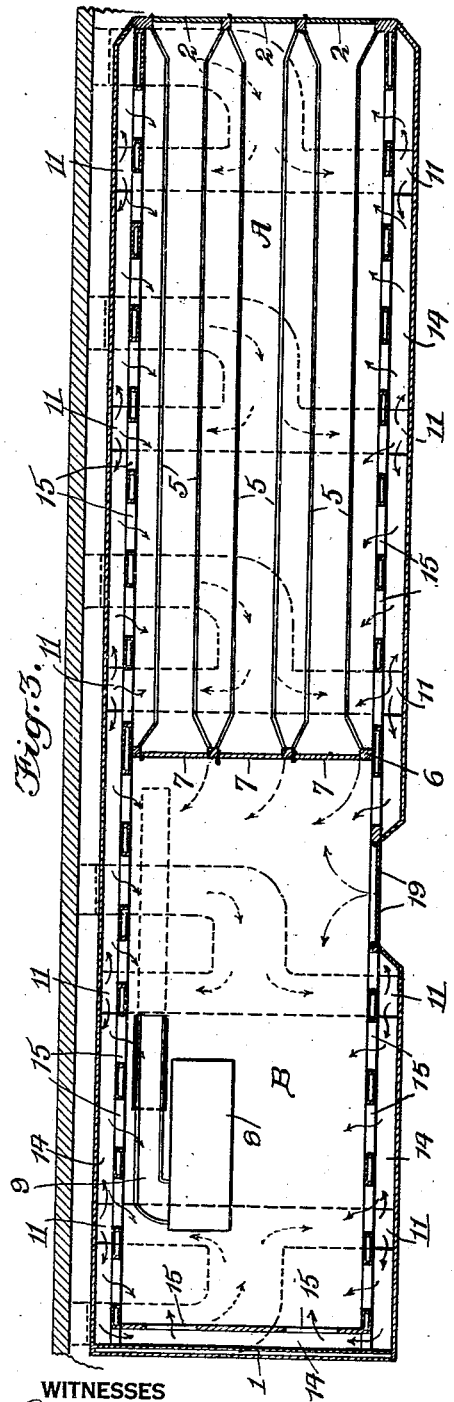
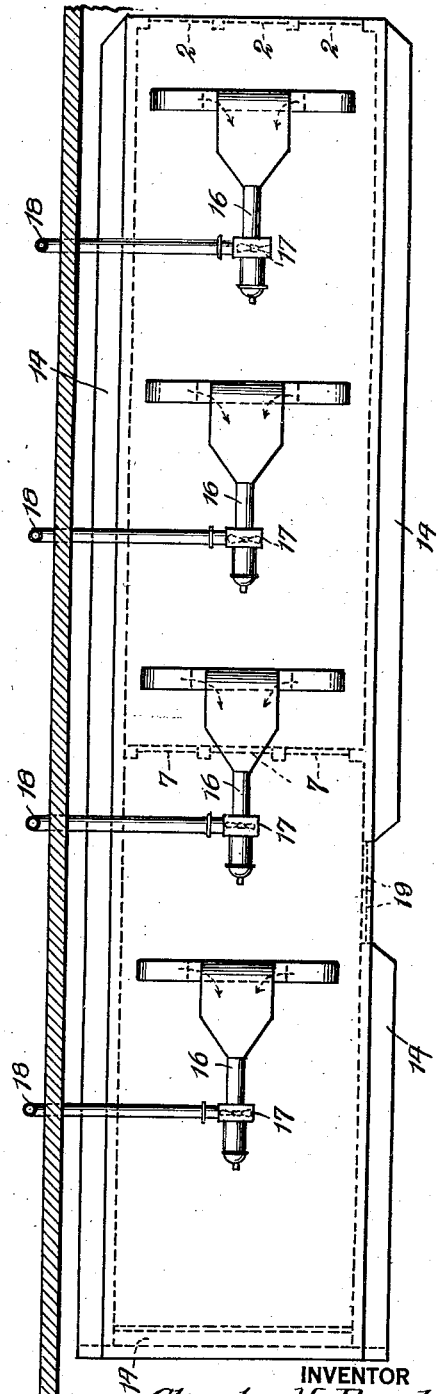
INVENTOR
Charles H. Purdy
BY
Munn, Anderson, Stanley, Foster & Liddy
ATTORNEYS Patented Apr. 17, 1934

1,955,655

UNITED STATES PATENT OFFICE 1,955,655

BAKERY EQUIPMENT AND METHOD OF USING THE SAME

Charles H. Purdy, New York, N. Y.

Application September 19, 1933, Serial No. 690,143

6 Claims. (Cl. 107—54)

This invention relates to bakery equipment and method, an object of the invention being to maintain the bakery products which, to avoid repetition, shall be hereinafter referred to as bread, under the same air condition during cooling, slicing and wrapping and packing for shipment.

More specifically, the invention includes a room or compartment in which the bread from the oven is conveyed on suitable racks and moved through the room or compartment, allowing the bread to cool, and then the bread is moved into a second compartment where the bread is wrapped and sliced, if desired, and next the bread is moved into a third room or compartment where the wrapped bread is packed in cartons or other receptacles for shipment, and all of these compartments are maintained with exactly the same air condition, the air from the packing room or compartment being caused to circulate through both the other compartments so that from the time the bread is received in the first compartment until the time it is shipped the air condition to which it is subjected remains exactly the same.

I am aware of the fact that so-called cooling rooms have heretofore been provided in which conditioned air of some sort is maintained and circulated to cause the bread to cool, and I would have it distinctly understood that I do not subject the bread to any particular temperature or to any particular humidity nor to any specific conditioning other than that the bread is maintained in the same atmospheric condition from the time it enters the first compartment until it is ready for shipment.

With these and other objects in view, the invention consists in certain novel features of construction and arrangements of parts, all of which will be more fully hereinafter described and pointed out in the claims.

In the accompanying drawings,—

Figure 1 is a view in longitudinal section illustrating bakery equipment embodying my invention;

Figure 2 is a view in section on the staggered line 2/2 of Figure 1;

Figure 3 is a sectional plan view through the cooling and wrapping rooms or compartments; and Figure 4 is a top plan view.

In carrying out my invention I provide a building structure which includes what may be termed a cooling room A, a wrapping room B and a packaging room C. In the drawings the room C is shown at a lower level than the rooms A and B but this is, of course, immaterial as the room C may be located as desired and in accordance with the particular building in which the construction is located.

The two rooms or compartments A and B preferably form a relatively long continuous building, having hollow walls 1 with dead air spaces, or the walls may be otherwise formed so as to provide a certain amount of insulation, as these rooms A and B may be located for convenience adjacent the ovens and it is desirable to prevent heat of the oven being transferred to the compartments so far as it is possible. The room or compartment A is provided in one end with any desired number of entrance doors 2 which, when open, permit the entrance of racks 3 carrying bread from the ovens. These racks 3 are the standard type of equipment having casters 4 which allow them to roll readily over the floor, and tracks 5 are provided on the floor of the room or compartment A between which the casters 4 are guided to ensure a proper longitudinal movement of the racks through the room. The room A is separated from the room B by a suitable partition 6, and doors 7 in the partition control communication between the two rooms. When the doors 7 are open the racks containing the bread may be moved into the room or compartment B. In this room or compartment B a slicing and wrapping machine, indicated diagrammatically by the reference character 8, is located and the bread from the racks is passed onto the machine, is sliced and wrapped, and then is conveyed to the packaging compartment C.

In the present illustration, as this room C is located below the rooms A and B an inclined chute 9 may be provided communicating with the room B and inclining downwardly to a table 10 in room C, so that the wrapped bread may be fed by gravity onto the table 10 and there placed in cartons or other receptacles ready for shipment.

A series of air intake flues 11 are located in the room or compartment C, having their screened entrances 12 located preferably just above the floor 13 of the room. These flues 12 communicate with side flues 14 outside of and preferably at the floor level of rooms A and B. The flues 14 extend along the floor and communicate by means of screened openings 15 with the lower interior portion and at both sides and at one end of the rooms A and B. Outlet flues 16 communicate with the tops or ceilings of the rooms A and B, and suction fans or blowers 17 communicate with these outlet flues 16 to induce a draft or circulation from the room C through the rooms A and B and out to the atmosphere through suitable pipes 18. It is not my purpose to create a very appreciable draft of air but merely to induce a suction which will cause the air to continuously circulate from the room C through the rooms A and B, and thus maintain bread under exactly the same air condition from the time it enters the room A until it leaves the packaging room C.

While, of course, the invention is not limited to the precise manner of handling the racks, they are preferably manually moved through the room or compartment A and into the room B as fast as desired, and the empty racks can be discharged through doors 19 in the side wall of the room or compartment B and returned to the ovens to receive bread therefrom.

I am convinced that best results are had not by subjecting the bread to a humidified, cooled circulation of air, as has been contemplated by apparatus and methods heretofore known, but on the contrary bread should not be chilled. The important factor is that the bread once entering the cooling room should be maintained under exactly the same air condition from the time it enters until it is wrapped and packaged ready for shipment, and the particular apparatus which I have described enables the carrying out of this method.

While I have illustrated what I believe to be the preferred embodiment of my invention, it is to be distinctly understood that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. The herein described method which comprises the movement of freshly cooked bakery products through a receiving compartment, thence through a wrapping compartment, and thence to a packaging compartment, and maintaining a circulation of air drawn from the packaging compartment through the other compartments so that exactly the same air condition is in all of said compartments.

2. A bakery equipment comprising a cooling compartment, a wrapping compartment communicating therewith, doors regulating communication between the compartments, a packaging compartment, means for conveying the wrapped products from the wrapping compartment to the packaging compartment, and means causing air to circulate from the packaging compartment through the other compartments so that the bakery products are maintained under exactly the same air condition in all of the compartments.

3. A bakery equipment comprising an elongated building structure having a partition therein dividing the structure into a cooling room and a wrapping room, a packaging room adjacent the other rooms, means for conveying bakery products from the wrapping room to the packaging room, and means for compelling a continuous circulation of air from the packaging room to and through the cooling room and wrapping room so that a uniform air condition is maintained in all three rooms.

4. A bakery equipment comprising an elongated building structure having a partition therein dividing the structure into a cooling compartment and a wrapping compartment, a packaging compartment adjacent the other compartments, means for conveying bakery products from the wrapping compartment to the packaging compartment, flues at the sides of the cooling compartment and the wrapping compartment communicating with the interior thereof, inlet flues connecting the packaging compartment with said first mentioned flues, outlet flues communicating with the top of the cooling compartment and the packaging compartment, and suction motors inducing a suction through said last mentioned flues.

5. The combination with a cooling compartment and a wrapping compartment located in alignment, a partition separating said compartments, entrance doors at one end of the cooling compartment, flues at the base and at both sides of the structure and communicating with the interior thereof, a packaging compartment located adjacent the first mentioned compartments, flues connecting the packaging compartment with the first mentioned flues, and suction means communicating with the upper portions of the first mentioned compartments and inducing a circulation of air from the packaging compartment through both of the first mentioned compartments.

6. A bakery equipment comprising three rooms, one room constituting a cooling room, another room constituting a wrapping room, and the third room constituting a packaging room, doors separating the wrapping room from the cooling room, a conveyer for the bakery products connecting the wrapping room and the packaging room, and means for maintaining a continuous circulation of air from the packaging room through the other two rooms so that exactly the same air condition is maintained in all three rooms.

CHARLES H. PURDY.